United States Patent [19]
DeHoff et al.

[11] 3,727,991
[45] Apr. 17, 1973

[54] PRESSURE PROPORTIONING CONTROL VALVE

[75] Inventors: Edward J. DeHoff; Donald E. Schenk, both of Dayton, Ohio

[73] Assignee: General Motors Corporation, Detroit, Mich.

[22] Filed: May 1, 1972

[21] Appl. No.: 249,314

[52] U.S. Cl. .................................303/6 C, 188/349
[51] Int. Cl. .........B60t 8/26, B60t 11/34, B60t 17/22
[58] Field of Search ..................303/6 C, 84, 84 A, 303/22 A; 188/345, 349, 151 A

[56] References Cited

UNITED STATES PATENTS

| | | | |
|---|---|---|---|
| 3,597,014 | 8/1971 | Stokes | 303/6 C |
| 3,597,015 | 8/1971 | Stokes | 303/6 C |
| 3,608,977 | 9/1971 | Kersting | 303/6 C |
| 3,661,426 | 5/1972 | Tam | 303/6 C |
| 3,663,067 | 5/1972 | Yabuta | 303/6 C |
| 3,667,810 | 6/1972 | Silagy | 303/6 C |

*Primary Examiner*—Allen N. Knowles
*Attorney*—W. E. Finken et al.

[57] ABSTRACT

A brake pressure proportioning valve assembly with an annular proportioning piston and valve cooperating with an annular valve seat, the outer periphery of the valve seat being a portion of the proportioning valve, and the inner periphery of the annular valve seat having a check valve control mechanism actuated to open either by differential pressure upon brake release or by pressure loss in another brake circuit so as to bypass the proportioner valve elements.

2 Claims, 2 Drawing Figures

PATENTED APR 17 1973  3,727,991

PRESSURE PROPORTIONING CONTROL VALVE

The invention relates to a brake pressure proportioning control valve, and more particularly, to one having a by-pass arrangement preventing brake apply pressure from exceeding the brake supply pressure at any time during brake release, and also acting to override the proportioning mechanism should a pressure loss occur in another brake pressure supply circuit.

In brake pressure control valves having a proportioning piston receiving brake supply pressure on one side and proportioning valve elements so that the brake supply pressure passing between the valve elements becomes brake apply pressure on the other side, with the valve seat element being exposed to brake apply pressure which tends to move it into engagement with its cooperating valve element, a pressure cycle can occur during which the brake apply pressure can exceed the brake supply pressure for a short time during brake release. This occurs because upon brake release the brake supply pressure decreases rapidly and the brake apply pressure acts on the valve unit to close the proportioning valve elements, thereby momentarily trapping brake apply pressure. This pressure decreases only after a sufficient decrease in the brake supply pressure has occurred to again permit the valve to be disengaged from the valve seat element on the proportioning piston. The decrease in brake apply pressure then occurs quickly and the brake supply and apply pressures are balanced.

The invention herein disclosed and claimed prevents the brake apply pressure from exceeding the brake supply pressure at any time in such a valve arrangement. It also provides mechanism for overriding the proportioning action of the valve assembly under certain conditions of operation.

Figure 1:
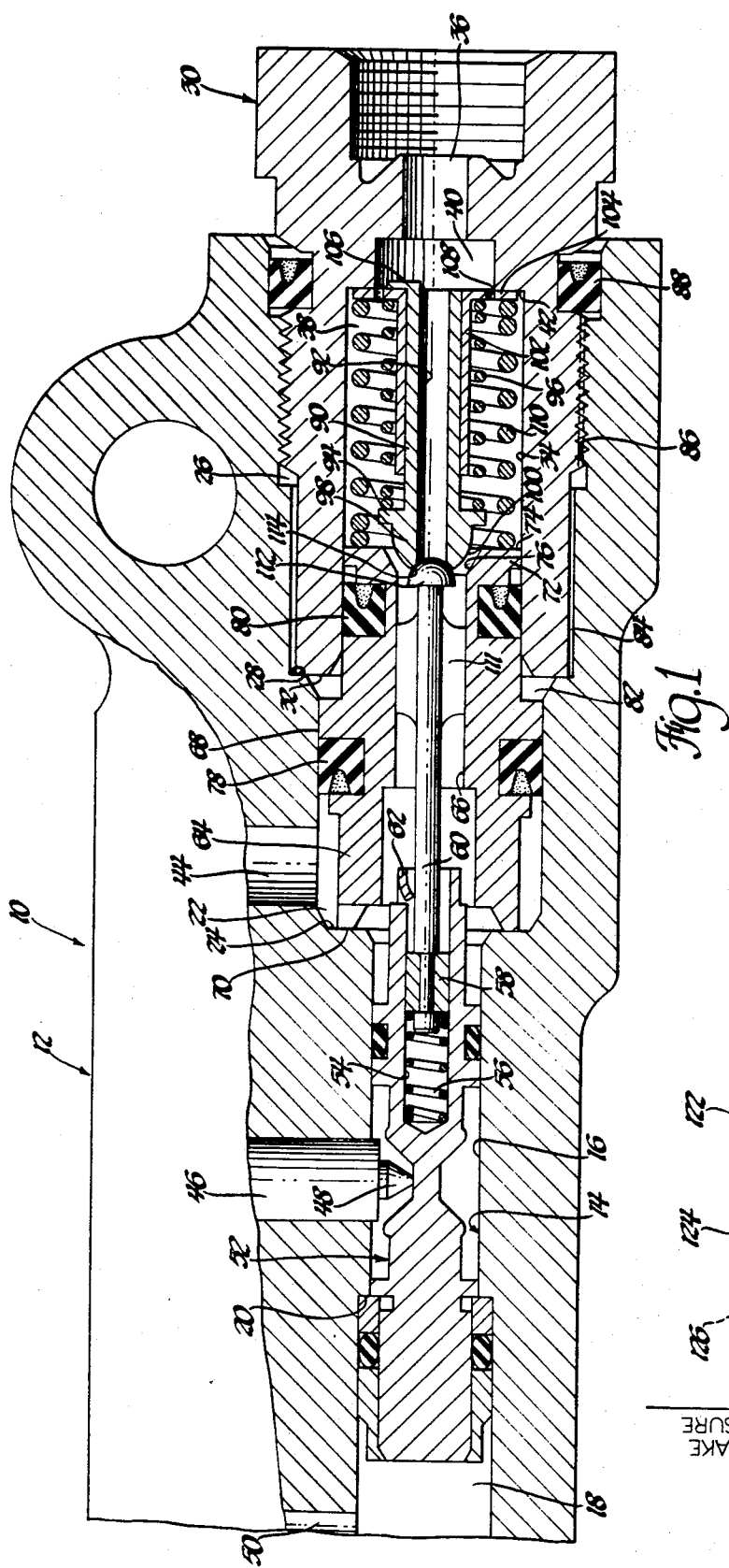
FIG. 1 is a cross-section view, with parts broken away, of a control valve embodying the invention.

The control valve assembly 10 includes a housng 12 through which a bore 14 is formed. The bore includes a center bore section 16 separated on one side from chamber 18 by shoulder 20 and, on the other side, from chamber 22 by shoulder 24. Chamber 22 is in turn separated from a chamber 26 by another shoulder 28. Chambers 18, 22 and 26 are enlarged portions of bore 14. An end cap 30 is threaded into the end of chamber 26 so that its inner end 32 engages shoulder 28. End cap 30 is also provided with a through bore 34 which is axially concentric with bore 14. The outer end of bore 34 provides a brake apply pressure outlet 36. Outlet 36 is conneted to chamber 38, formed by the main portion of bore 34, through an intermediate chamber 40. Chambers 38 and 40 are separated by a shoulder 42.

The housing has a brake supply pressure inlet 44 which is connected with chamber 22 adjacent shoulder 24. A brake pressure loss warning switch assembly 46 is received in the housing 12 centrally of the bore center section 16 and has a switch actuating probe 48 extending into the bore section 16. Chamber 18 is connected to another brake supply pressure inlet 50 so that another brake pressurizing circuit is permitted to supply brake pressure to this chamber. A shuttle piston assembly 52 is reciprocably received in bore center section 16 and operates upon sufficient axle movement in either direction to move probe 48 and actuate the warning switch assembly 46. Piston assembly 52 is normally positioned as shown in FIG. 1, with brake supply pressure entering inlet 44 and contained in chamber 22 acting on one side of the piston assembly, and the separate brake supply pressure entering through inlet 50 and contained in chamber 18 acting on the other side of the piston assembly. The operation of a mechanism of this type is more fully disclosed and described in Application Ser. No. 72,992, filed Sept. 17, 1970, entitled "Combination Valve Assembly with Proportioner Override" and assigned to he common assignee. It is sufficient for the purpose of this invention to note that fact that the piston assembly 52 will move leftwardly as the pressure in chamber 22 exceeds that in chamber 18 by a predetermined amount, and will move rightwardly as the pressure in chamber 18 exceeds the pressure in chamber 22 by a predetermined amount.

The right end of piston assembly 52 is provided with a recess 54 opening into chamber 22. A light compressin spring 56 at the inner end of recess 54 acts against the fluted guide 58 of the valve stem 60 which is slidably received in recess 54. A tab 62, formed from a portion of piston assembly 52, retains the fluted guide 58 within recess 54. When piston assembly 52 moves sufficiently leftward, the valve stem 60 moves leftwardly with it.

The proportioning piston 64 has a bore 66 formed therethrough and a center land 68 on its outer periphery, land 68 being reciprocably received in the portion of bore 14 forming chamber 22. The end 70 of piston 64 extending toward piston assembly 52 is castellated so that fluid under pressure may pass from inlet 44 into the right end of bore section 16 and through bore 66. The right end 72 of piston 64 is formed with a face 74 defining one end of chamber 38. End 72 is reciprocably received in bore 34. A valve element 76, formed as an annular valve seat, is provided at the inner periphery of the piston end 72 where the right end of bore 66 extends through the piston. Suitable seals 78 and 80 are provided on piston 64, seal 78 being on the left side of land 68 and seal 80 being adjacent the piston end 72. The portion of bore 14 adjacent shoulder 28 and defined in part by cap inner end 32 is positioned axially between seals 78 and 80 and is identified as chamber 82. An annular passage 84, formed between the right end of bore 14 and a portion of cap 30, leads from chamber 82 through a vent passage formed through the threads 86 of cap 30 and housing 12 so as to vent chamber 82 to atmosphere past V-block seal 88. Seal 88 is positioned in the extreme right end of bore 14 between the bore and end cap 30 and prevents foreign material from entering the housing while, at the same time, preventing a build-up of pressure in chamber 82.

A valve unit 90 is reciprocably received in chamber 38 and has a bore 92 extending therethrough. The left end of unit 90 is provided with a flange 94 acting as a seat for compression spring 96. The left end of unit 90 is also formed with a head 98 having a portion thereof providing the other proportioning valve element 100. This valve element is arranged to cooperate with the valve seat element 76 to provide the proportioning valve of the assembly. A valve unit guide 102 is positioned about valve unit 90 and has its right end formed to provide a flange 104. This flange acts as the other seat for compression spring 96, and is limited in its movement relative to valve unit 90 by a tab 106 turned up from the right end of the valve unit 90. Ports 108 are provided through flange 104 to fluid connect chambers 38 and 40. Another compression spring 110 is also contained in chamber 38, with its right end seated against flange 104 and its left end seated against face 74 of piston 64. Valve stem 60 is provided with another fluted guide section 111 which is slidably received in bore 66 of piston 64 so as to position the valve stem centrally in the bore and, at the same time, permit flow of fluid through the bore 66. The right end of valve stem 60 is formed as a head to provide a valve element 112. A valve seat 114 is formed on the left end of valve unit 90 where bore 92 extends therethrough, the valve seat 114 being annular and cooperating with valve 112 to normally seal bore 92 from bore 66, subject to the conditions of operation described below.

Figure 2:
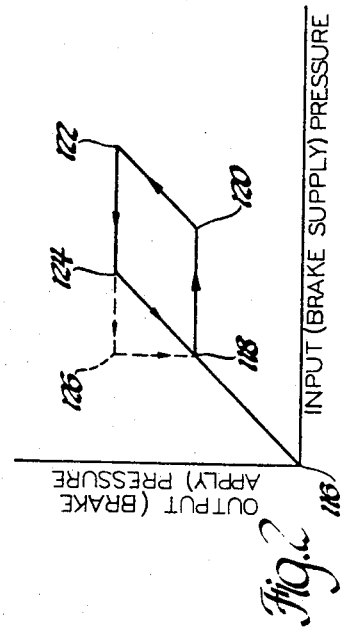
FIG. 2 is a graph showing the pressure relationships obtained during operation of the valve of FIG. 1.

During normal braking operation, the assembly is in the position shown in FIG. 1 when the brake supply pressure is either nonexistent or is below the level required to actuate the proportioning mechanism. As seen in FIG. 2, this is the portion of the curve between points 116 and 118. Supply pressure freely enters inlet 44 and passes through piston castellated end 70 and piston bore 66, through the space between the valve elements 76 and 100 to chamber 38, then out through ports 108 and chamber 40 to outlet 36. Outlet 36 is suitably connected to the vehicle rear brakes, for example. At the same time, brake supply pressure in another brake circuit passes from inlet 50 to chamber 18 and through any other appropriate mechanism, such as a metering valve, to the vehicle front brakes. These pressures are normally sufficiently equal in value to have no effect on movement of piston assembly 52. When the brake supply pressure entering inlet 44 reaches point 118 of the curve of FIG. 2, the brake apply pressure in chamber 38 and the force of spring 110 are not sufficient to resist the greater force generated by the brake supply pressure acting on the larger area of the left end of piston 64, so that piston 64 moves rightwardly to engage valve elements 76 and 100. The brake supply pressure, therefore, increases along the line from point 118 to point 120, but the brake apply pressure remains substantially constant. When the brake supply pressure exceeds that at point 120, it is sufficient to act against valve unit head 98 to overcome the combination of forces generated on that head by spring 96 and the brake apply pressure in chamber 38, causing the valve unit 90 to move slightly rightward in guide 102 and a proportioning action to take place between proportioning valve elements 76 and 100. Valve element 112 will remain seated against its seat 114 due to the pressures on it and the force of spring 56. The brake apply pressure in chamber 38 will then increase along the curve from point 120 to point 122. As the brake supply pressure continues to increase, point 122 becomes the point of maximum brake pressure attained during any particular brake cycle. When the brake is released, the brake supply pressure in inlet 44 decreases. This quickly allows the valve unit head 98 to be moved leftwardly to close the proportioning valve by engagement of valve element 100 with valve element 76. Therefore, the brake apply pressure is momentarily trapped and does not decrease as the brake supply pressure decreases. This portion of the curve in FIG. 2 is between points 122 and 124. When the brake supply pressure reaches point 124, the brake apply pressure in bore 92 overcomes the balance of forces causing valve 112 to be engaged with valve seat 114, thereby opening bore 92 to bore 66 and connecting brake apply pressure in chambers 38 and 40 with the brake supply pressure in chamber 22. The brake supply and apply pressures then decrease from point 124 to point 118 and eventually to point 116.

In proportioning valves not having valve 112, valve seat 114 and bore 92, the higher brake pressure in chamber 38 keeps the valve elements 76 and 100 engaged until the pressure reaches point 126 of the dashed portion of the curve of FIG. 2. At this time, the spring 110 is able to overcome the force generated by the lower brake supply pressure in chamber 22 so as to move piston 64 leftwardly. This causes the brake apply pressure to immediately decrease along the dashed curve from point 126 to point 118. When the brake supply pressure and brake apply pressure are thus equalized, further reductions in brake supply pressure occur along the curve from point 118 toward point 116.

If at any time during brake actuation a pressure loss occurs, resulting in a pressure decrease in chamber 18 of a predetermined amount relative to the pressure in chamber 22, piston assembly 52 will be moved leftwardly until tab 62 picks up fluted guide 58. Thereafter, the valve stem 60 and its valve 112 will move leftward with piston assembly 52 and valve 112 will be disengaged from its valve seat 114. This will immediately connect inlet 44 with outlet 36 through chamber 52, bore 66, bore 92, and chamber 40, effectively bypassing any proportioning action of valve elements 76 and 100. Thus, under this condition of operation, full brake supply pressure is transmitted to apply the brakes connected with outlet 36.

What is claimed is:

1. A control valve assembly comprising:
   a housing,
   pressure proportioning means having a valve seat element and movable in said housing to control the application through said housing of fluid pressure supplied thereto,
   other means in said housing including a valve unit having a valve element proportioning engagement with said proportioning means valve seat element,
   first resilient means urging said proportioning means toward a position at which its valve seat element is disengaged from said valve unit valve element to effect the full application through said housing of supplied fluid pressure less than a predetermined value;
   second resilient means urging said valve unit and therefore its valve element toward a position engaged with said proportioning means valve seat element, and means establishing a limit of movement of said valve unit toward that position;
   opposed differential areas on said proportioning means respectively subjected to the supplied and applied fluid pressures with the larger of said areas being subjected to the supplied fluid pressure;

opposed areas on said valve unit respectively subjected to the supplied and applied fluid pressures;

said proportioning means being initially movable against the force of said first resilient means toward a position at which the valve seat element thereof is in proportioning engagement with said valve unit valve element isolating the supplied and applied fluid pressures when the magnitudes thereof acting on said opposed differential areas attain the predetermined value;

and said other means valve unit being thereafter movable, relative to said proportioning means in response to increases in the supplied fluid pressure in excess of the predetermined value acting on one of said valve unit opposed areas and opposed by the force of said second resilient means, toward another position disengaged from said proportioning means and effecting a proportioned increase in the applied fluid pressure acting on the other of said opposed differential areas in a predetermined ratio with the increased supplied fluid pressure;

passage means in said other means valve unit for the return flow of the applied fluid pressure when said proportioning means is positioned in engagement with said other means valve unit;

and uni-directional valve means in said passage means subjected to the supplied and applied fluid pressures for controlling the return flow of the applied fluid pressure therethrough;

said uni-directional valve means being movable in response to the applied fluid pressure acting thereon toward a position in said passage means establishing the return flow through said passage means of the applied fluid pressure to reduce the magnitude thereof upon the reduction of the magnitude of the supplied fluid pressure to a value less than that of the applied fluid pressure;

said proportioning means being thereafter movable toward its original position in said housing when the force of said first resilient means overcomes that of the reduced magnitude of the applied fluid pressure acting on said other opposed differential area.

2. The control valve assembly of claim 1, said other means further including a piston movable in said housing and having a lost-motion connection with said uni-directional valve means;

opposed effective areas on said other means piston respectively subjected to the first named supplied fluid pressure and another fluid pressure supplied to said housing;

said other means piston being movable and acting through said lost-motion connection to move said uni-directional valve means out of engagement with said other means valve unit to obviate the proportioning effect of said proportioning means on said first named supplied fluid pressure in response to the first named supplied fluid pressure acting on one of said piston opposed effective areas in the event of the failure of the other supplied fluid pressure acting on the other of said piston opposed effective areas.

* * * * *